No. 788,736. Patented May 2, 1905.

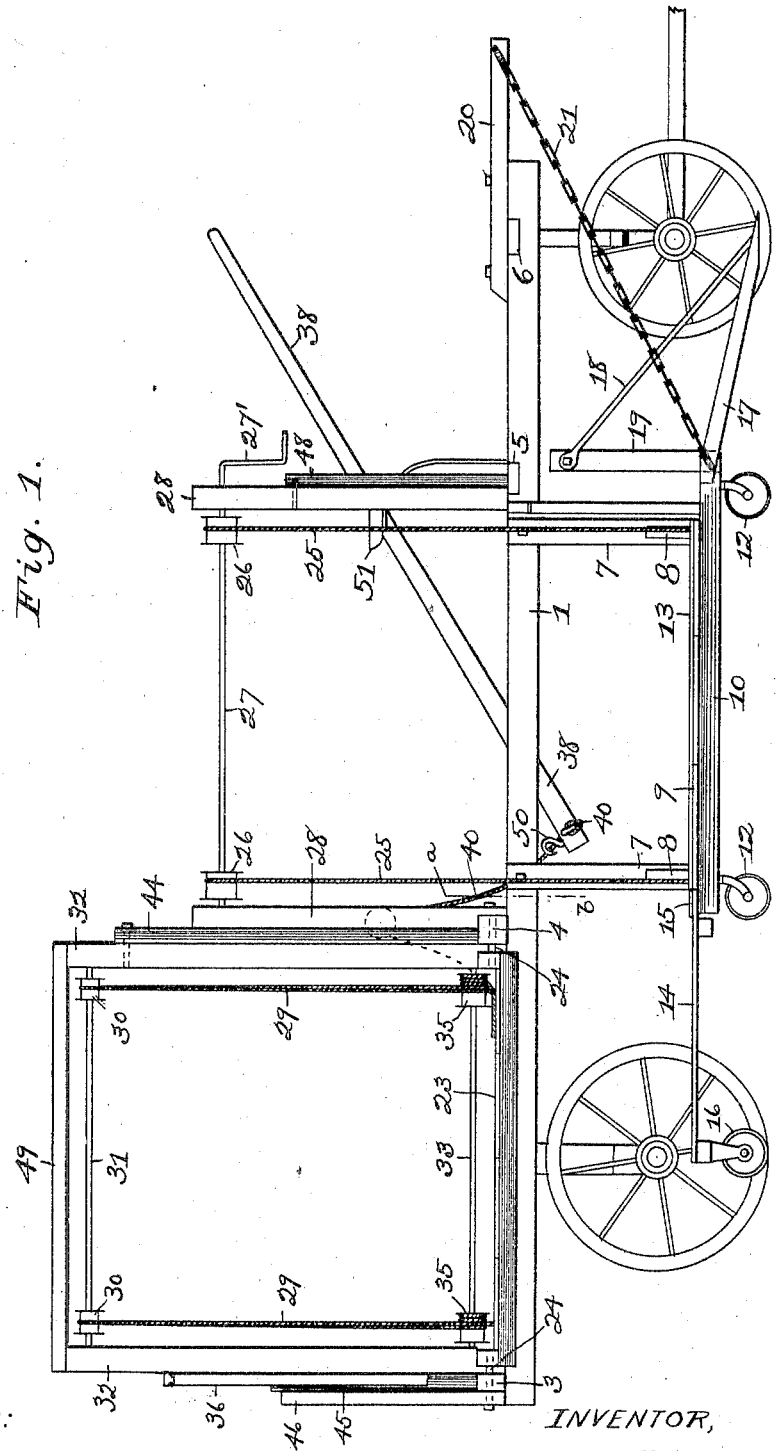

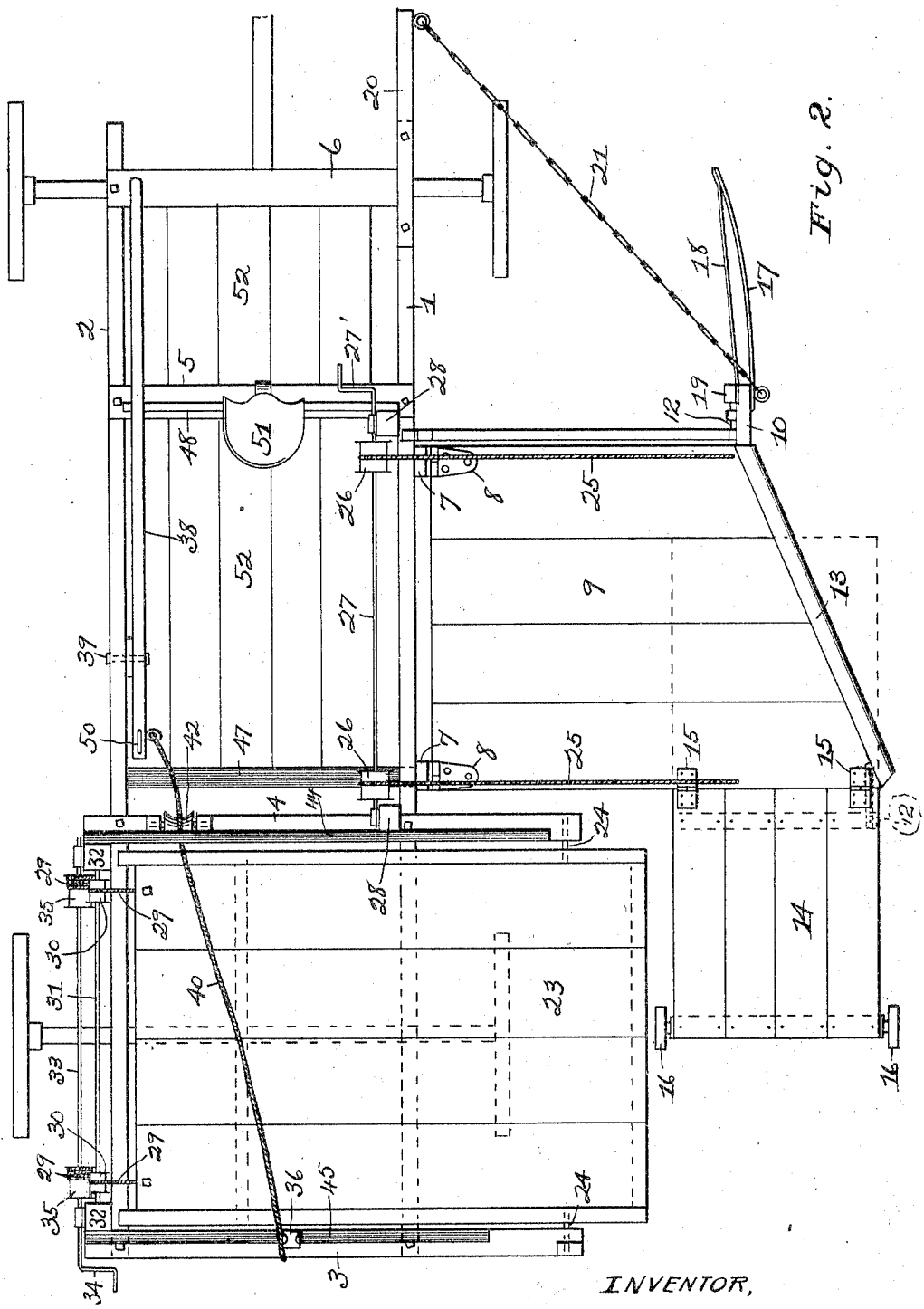

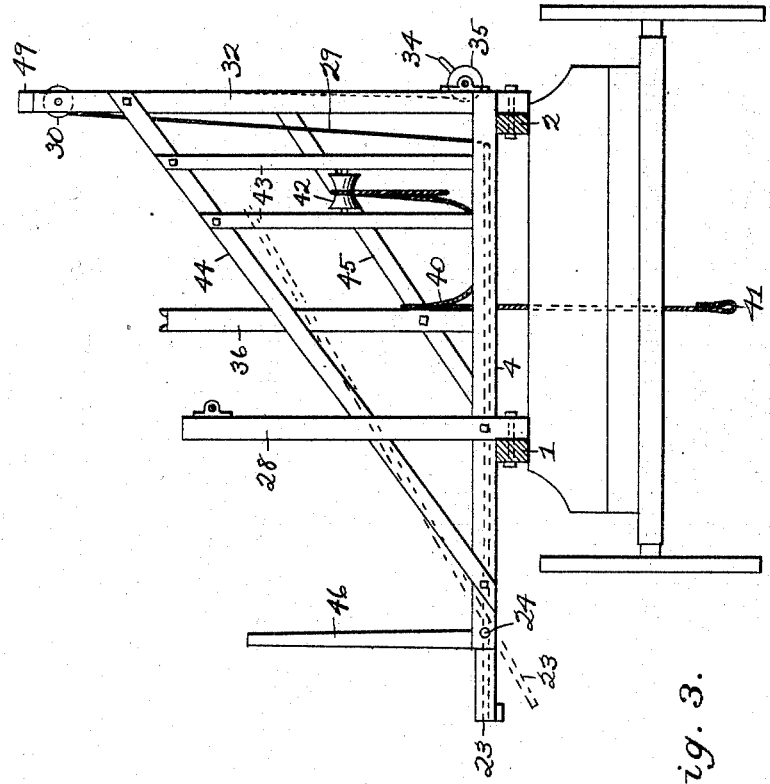

UNITED STATES PATENT OFFICE.

JAMES B. STRAIGHT, OF BATES CITY, MISSOURI.

CORN-HARVESTER.

SPECIFICATION forming part of Letters Patent No. 788,736, dated May 2, 1905.

Application filed April 7, 1903. Serial No. 151,483.

*To all whom it may concern:*

Be it known that I, JAMES B. STRAIGHT, a citizen of the United States, residing at Bates City, in the county of Lafayette and State of Missouri, have invented new and useful Improvements in Corn-Harvesters, of which the following is a specification.

My invention relates to that class of corn-harvesters in which the corn is cut by a knife carried by a suitable vehicle and the corn is manually collected and deposited upon a tilting shock-holder or "dropper," after which the vehicle is stopped and the shock is manually tied.

Referring now to the drawings, Figure 1 is a right-hand side elevation of a harvester embodying my invention. Fig. 2 is a plan view of the same, a cross-beam 49 being omitted. Fig. 3 is a transverse vertical section taken on line *a b* of Fig. 1 looking toward the rear.

The frame of the harvester consists of longitudinal sills 1 2, which are secured to the under side thereof, as indicated by dotted lines on the upper side of said platform, as seen at Fig. 2, connected by cross-pieces 3, 4, 5, and 6. The sills 1 2 are supported by any suitable running-gear.

Bolted to the right-hand sill 1 are two depending hangers 7, the lower ends of which are connected by hinges 8 to the inner edge of the cutter-platform 9. The outer edge of this platform is supported by caster-wheels 12. A knife 13 for severing the stalks is rigidly secured to the outer edge of platform 9 and set obliquely, as shown.

17 is a guide for raising bent-over stalks of corn to upright position. This guide is secured to a sill 10 of platform 9 and is braced by a rod 18 and a post 19.

Connected by hinges 15 to the back of platform 9 is a trailing platform 14, the rear end of which is supported by wheels 16.

Platform 9 may be raised and lowered by means of a crank 27' on a shaft 27, on which are drums 26, to which are secured ropes 25, the lower ends of said ropes being secured to said platform. The bearings of shaft 27 are secured to posts 28, which are secured to the right-hand sill 1.

When the trailing platform 14 is not in use, it may be turned over upon the cutter-platform 9 in the position shown by dotted lines, Fig. 2.

The rear two cross-pieces 3 4 project past the right-hand sill 1. Between said cross-pieces is a tilting dropper 23, which is pivoted on pins or bolts 24, passing through the outer ends of said cross-pieces 3 4. The right-hand end of the dropper extends past said cross-pieces, as shown, so that the weight of a shock will come partly outside of said pivots 24.

The dropper 23 is raised and lowered by ropes 29, attached to its left-hand end, passing up around rollers 30 and down around winding-drums 35 on a shaft 33, having a crank 34. The shaft 31 of said rollers 30 passes through two posts 32, connected to their tops by a cross-beam 49. The bearings of shaft 33 are secured to said posts. The upper shaft 31 may of course be mounted in bearings instead of passing through said posts.

Planted on the rear cross-piece 3 and set about midway between the sills 1 and 2 is a post 36, the purpose of which is to prevent the stalks from falling off the rear end of the dropper. As shown in Figs. 1 and 3, post 36 is connected to an inclined brace 45, which extends from cross-piece 3 to the front post 32.

38 is a lever fulcrumed on a bolt 39, that passes through the left-hand sill 2. Secured to the lower end of said lever is one end of a rope 40, which is used for compressing the shocks before they are wired. This rope is passed over a roller 42 (held between posts 43) and laid across the dropper 23. In its opposite end is a loop 41 or its equivalent.

51 is the driver's seat, and 52 is a platform secured to cross-pieces 4, 5, and 6.

The tall posts 32 are braced, respectively, by braces 44 and 45.

The forward post 28 is braced by a brace 48. Bolted to the front portion of sill 1 is a forwardly-projecting beam 20, and extending from the front end of this beam to sill 10 of the cutter-platform 9 is a chain 21, which relieves the hangers 7 from strain and tends to equalize the draft upon said platform 9.

The harvester is drawn by horses, and the harvester is operated as follows: Two men are employed besides the driver. The driver stands on platform 52, while the other two men stand on platforms 9 and 14. As the stalks are severed by the knife 13 the two men take turns at throwing it upon the dropper 23, butts to the right. When the shock has become large enough to be bound, the driver passes the rope 40 over the shock and under the roller 42 and places its looped end 41 over a hook 50, secured to the lower end of the lever 38. He then pushes back the handle of the lever until the stalks are as tightly compressed as necessary and the wires are connected around the shock, they having been laid upon the dropper 23 before the stalks were piled. The driver disengages the loop 41 of rope 40 from the hook 50 and throws the end of the rope across the dropper to the position shown in Fig. 2. Then the dropper is tilted by winding its ropes 29 upon the drums 35, the trailing platform 14 is raised out of the way, and the shocks slide off the dropper. Other wires are placed upon the dropper, and the harvester is ready to cut another shock.

Having now fully described my invention, what I claim as new, and desire to secure by Letters Patent of the United States, is—

1. In a corn-harvester, a frame, a dropper-platform mounted pivotally on said frame, a driver's platform adjacent thereto, a lever fulcrumed on said frame and extending above and below the driver's platform, a rope having one end secured to the lower end of said lever and a loop at its opposite end, and a hook on the lower end of said lever for engaging said loop, whereby said rope may be passed around a shock upon said dropper-platform and its looped end connected to said hook, substantially as described.

2. In a corn-harvester, a frame, a dropper mounted pivotally thereon, a lever fulcrumed on said frame, a rope having one end secured to the lower end of said lever and a loop at its opposite end, a hook on the lower end of said lever for engaging said loop, and a roller 42 located at one side of the dropper, between the dropper and said lever, whereby a shock may be compressed by passing said rope over said roller, around the shock, back under the roller, connecting its looped end to said hook, and operating said lever, substantially as described.

In testimony whereof I affix my signature in the presence of two witnesses.

JAMES B. STRAIGHT.

Witnesses:
I. F. HEREFORD,
GEO. A. CAMPBELL.